March 24, 1925.
H. RICHARDSON
CAR UNLOADER
Filed Dec. 14, 1920
1,531,222
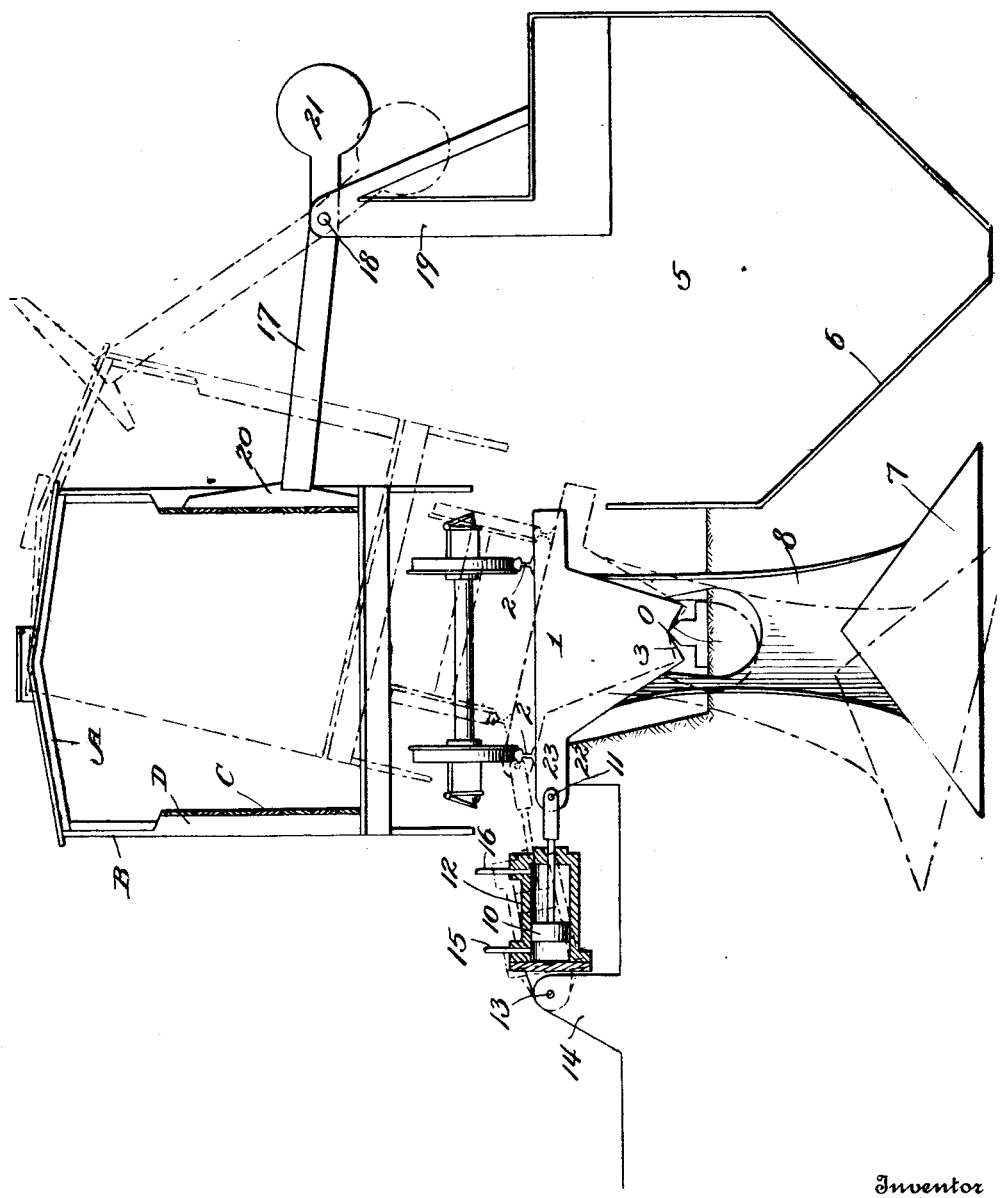
Inventor
Henry Richardson
By
Attorney Patented Mar. 24, 1925.

1,531,222

UNITED STATES PATENT OFFICE.

HENRY RICHARDSON, OF PASSAIC, NEW JERSEY.

CAR UNLOADER.

Application filed December 14, 1920. Serial No. 430,699.

*To all whom it may concern:*

Be it known that I, HENRY RICHARDSON, a subject of the King of Great Britain, residing at Passaic, in the county of Passaic and State of New Jersey, have invented certain new and useful Improvements in Car Unloaders, of which the following is a specification.

My present invention relates to improvements in car unloaders and more especially to car unloaders of a kind adapted to unload railway cars containing grain or other material in bulk. The primary object of the invention is to provide a novel and efficient apparatus whereby the car to be unloaded is tilted laterally, while the door opener is arranged to engage and hold against lateral movement, a door or closure in the side of the car, in consequence of which the door or closure will be unfastened and pushed inwardly in a direction away from the adjacent side of the car, thus providing openings through which the grain or other contents of the car may flow and thus discharge therefrom, the tilting movement of the car serving not only to open the door or closure thereof, but to also induce a flow of the grain or other contents toward and through the door opening.

Preferably, the lateral tilting movement of the car takes place about a longitudinal axis, which is so located relatively to the center of weight of the loaded car, that the load in the car will act to tilt the car, after the tilting movement has been initiated, and to thus provide a force which will insure the unfastening and pushing in of the door against the pressure of the grain or other contents of the car, and the door opener acts on the door in such relation to said axis as to cause opening of the door by a substantially direct inward movement thereof relatively to the adjacent side of the car, thus providing a maximum extent of opening of the door for a given angle of lateral tilt of the car and insuring certainty of the door opening operation.

To these and other ends, the invention consists in certain improvements and combinations and arrangements of parts, all as will be hereinafter more fully described, the features of novelty being pointed out particularly in the claims at the end of the specification.

The accompanying drawing shows in end elevation, a car unloader and a cooperative door opener constructed in accordance with the present invention.

The present invention is applicable to the unloading of cars containing grain or other material in bulk, it being particularly adapted for use in the unloading of grain cars which ordinarily consist of ordinary railway box cars having boards placed horizontally across the door openings in the sides of the car and secured in place by nailing such boards to the uprights at opposite sides of the respective door openings. The preferred embodiment of the invention is shown in the accompanying drawing and will be hereinafter described in detail. It is to be understood, however, that the invention is not restricted to the particular construction shown, as equivalent constructions are contemplated and these will be included within the scope of the claims.

By reference to the accompanying drawing, it will be understood that A represents an ordinary railway box car adapted for the transportation of grain and similar materials, the door openings B in the opposite sides of the car being closed by a suitable number of boards C which are placed one upon the other and arranged horizontally across the respective door openings and are secured in place by nailing them to the uprights D at the opposite sides of the respective door openings. The unloader comprises a platform or bridge 1 having rails 2 extending longitudinally thereon and on which the wheels of the car ride. These rails are in alinement with or form continuations of stationary rails which lead to the unloader and over which the cars are conveyed to and from the unloader. The platform or bridge is mounted to tilt laterally and to carry with it a car resting on the rails 2, the lateral tilting movement of the platform and the car taking place about an axis O which is located preferably slightly to one side of the perpendicular plane of the center of weight of the loaded car and a suitable distance below the car. A knife-edge bearing 3 and 4, arranged longitudinally of the platform is indicated in the present instance as a support and a bearing which enables the platform and a car thereon to tilt laterally about the axis O, and the full and dotted lines in the drawing indicate substantially the two extreme positions which the platform and car may assume. Preferably, the platform occupies a substantially upright position, as indicated by the full lines in the drawing when ready to receive or discharge a car, at which time the rails on the platform will be in alinement with the adjacent stationary rails, and the platform and car are tilted laterally from the full line position to the dotted line position in the drawing, to perform the operation of opening the door in the side of the car and of inducing a flow of the grain or other material from the car. A pit 5 is preferably provided at the side of the platform where the material is discharged from the car, and this pit may be equipped with a hopper 6 to suitably direct the discharged material into conveying or elevating apparatus. The necessary tilting movements may be effected or controlled by different mechanisms. For example, as shown in the present instance, a counter-weight 7 is rigidly attached by a depending arm 8 to the underside of the platform or bridge 1, this counter-weight being so arranged and proportioned that it will locate the center of weight of the structure comprising the bridge and the car thereon substantially at the center O when the car is almost empty, so that the counter-weight will act to return the bridge and the car thereon from the dotted line position to its normal full line position when the car is empty, and to retain the platform or bridge in the latter position in readiness to receive a car to be unloaded, but the counterweight will not prevent the falling forward of a loaded car toward the door opener. Tilting of the platform or bridge and the car thereon may be effected or controlled by fluid pressure apparatus embodying a piston 10, which is operatively connected at 11 to the platform or bridge and is arranged to reciprocate in a cylinder 12, the latter being pivotally connected at 13 to a relatively fixed abutment 14 and having conduits 15 and 16 leading into its opposite ends for admitting or discharging fluid under the control of suitable valves, to effect or control the reciprocating movements of the piston and to thus effect or control the tilting movements of the platform or bridge.

The door opener is located at the side of the bridge toward which the bridge and car tilt, and it consists, in the embodiment shown, of an arm or beam 17 which is pivoted at 18 to a stationary and rigidly supported upright 19, one end of the arm or beam having a head 20 which is adapted to bear against a portion or the whole of the door or closure consisting of the boards C, and the opposite end of the arm or beam is preferably provided with a counter-weight 21 which over-balances the opposite end of the arm and serves to hold the door opener in a substantially upright position, as indicated by the dotted lines in the drawing, when the door opener is not in use.

In operating a car unloader constructed as hereinbefore described, the car to be unloaded is shifted onto the platform or bridge 1, while the latter occupies the substantially upright full line position shown in the drawing. During the introduction of the car upon the platform or bridge, the door opener will occupy substantially the dotted line position shown and it will therefor clear the car. The door opener is then lowered or brought into an approximately horizontal position, as shown by the full lines in the drawing, the bottom of the head 20 resting on the floor of the car, as shown, and the face of the head 20 being opposite to the outer side of the door or closure formed by the boards C. With the door opener in this position, the platform or bridge 1, and the loaded car thereon are tilted into substantially the dotted line position shown, the tilting motion taking place about the axis O. The initial part of this tilting motion of the car and platform will bring the head 20 of the door opener into engagement with the outer side of the door, and as the tilting motion of the car continues, the door will be held against further movement while the car continues to tilt, in consequence of which the parts composing the door or closure will be unfastened or detached, and in effect pushed inwardly relatively to the adjacent side of the car, overcoming the internal pressure of the grain or contents of the car, and when the car has reached the limit of its tilting motion, as indicated substantially by the dotted lines in the drawing, openings of substantial width will have been produced between the ends of the door and the adjacent side of the car, and the grain or contents of the car will flow freely and rapidly through these openings, the flow of the grain or other material from the car being induced or increased by the lateral tilting of the floor of the car. During the pushing in of the door, the latter may drift upwardly so that it assumes a position above the floor of the car, due to the greater internal pressure of the grain at the bottom of the door, and such opening beneath the door will afford an additional passageway for the discharge of the grain or other contents. The contents of the car may be either partially or completely unloaded by tilting the car to the necessary angle. Where, however, the car is tilted to an angle which will only partially discharge the contents of the car by the natural flow of the grain or other material, completion of the unloading operation may be effected by shoveling apparatus, such as that commonly used in conjunction with grain elevators, or by any other unloading method. After the car has been completely unloaded, it is returned to its upright position, as shown by the full lines in the drawing, the door opener is swung upwardly into substantially the dotted line position shown, and the unloaded car may be removed from the platform or bridge and another car placed thereon for unloading.

A relatively fixed abutment 22 may be provided on which a projection 23 on one side of the platform may come to rest when the platform is returned to its normal upright position, whereby the platform will be held in a level position with its car rails in alinement with the adjacent relatively fixed rails. This abutment and cooperating stop are used especially where, as in the present instance, the axis O, about which the platform tilts, is offset toward the side of the platform adjacent to the door opener, the slight overbalance of the opposite side of the platform and also the car, being sustained by the abutment and its stop.

By mounting the car to tilt about an axis which is located below the car and approximately in the perpendicular plane of the center of weight of the load therein, the car is caused to tilt through such a path relatively to the door opener at the side thereof as to effect loosening and opening of the door by an approximately direct movement and this also insures opening of the door to a maximum extent for a given angle of tilt of the car. Furthermore, by locating the axis of tilt as described, the weight of the load in the car will furnish the force necessary to loosen and open the door against the pressure of grain or other material in the car, after the car and platform have been partially tilted by the fluid pressure apparatus or equivalent means.

I claim as my invention:—

1. In a car unloader, in combination, a car supporting platform mounted to tilt transversely about an axis located below the top thereof and below a car thereon, and a door opener operative on a door in the side of the car toward which the car is tilted to initially push the door directly inwardly with respect to the side of the car and to then push such door inwardly and thus complete the opening thereof in consequence of the tilting movement of the car.

2. In a car-unloader, in combination, a car-supporting platform tiltable transversely about an axis located below its top and below a car thereon and approximately in the perpendicular plane of the load in such car, and a door opener having a pivoted supporting member which is freely movable vertically while the door pusher is operative on a door in the side of the car to open the same in consequence of the tilting movement of the car.

3. In a car-unloader, in combination, a car-supporting member tiltable transversely about an axis located below its top and below a car thereon and offset to one side of the perpendicular plane of the center of weight of the load in such car, and a door opener located at the side of the car toward which said axis is located and adapted to rest on the floor of the car and to engage a door in such side of the car, the door being operative while the car is tilted laterally to carry said center of weight over said axis to push the door directly inwardly and subsequently to open such door in consequence of tilting movement of the car about said axis.

4. In a car-unloader, in combination, a car-supporting member mounted to tilt laterally about an axis located below its top and below a car thereon and offset to one side of the perpendicular plane of the center of the load in such car, a door opener located at the side of the car toward which it tilts and adapted to engage a door in the side of the car and to initially push the door directly inwardly relatively to the side of the car, means for initiating the tilting of said member and a car thereon, the weight of the load in the car completing such tilting movement and acting to complete the opening of the door.

5. In a car-unloader, in combination, a car-supporting member mounted to tilt laterally about an axis located below the top thereof, and a door opener adapted to engage a door in the side of said car and to initially push the door directly inwardly, the weight of the load in such car acting to tilt the car and to complete the opening of the door thereof.

6. In a car-unloader, in combination, a car-supporting member tiltable laterally about an axis located below its top, a supporting arm pivoted at one end to swing freely vertically about a fixed axis, and a door opener rigidly mounted on the opposite end of said arm and adapted to be positioned in the path of a door in the adjacent side of the car, lateral tilting of said member and a car thereon causing opening of the door thereof by the door opener.

7. In a car-unloader, in combination, a platform tiltable laterally about an axis located below its top and below the level of a car thereon and offset to one side of the perpendicular plane of the load in such car when the platform is in normal position, an abutment cooperative with the platform to sustain its overbalanced weight when in normal position, a door opener located at the side of the platform toward which the same is tiltable and adapted to be positioned in the path of a door in the adjacent side of the car, and means for overcoming the overbalance of the platform and a loaded car thereon and for forcing the car door substantially horizontally against the door opener, thus initiating the lateral tilting movement of the car and platform and causing the door to be initially pushed directly inwardly relatively to the side of the car, the weight of the load in the car completing such tilting movement and acting to complete the opening of the door thereof.

8. In a car-unloader, in combination, a car-supporting member tiltable laterally about an axis located below a car thereon, a door opener mounted at one side of said member and adapted to be positioned in the path of a door in the adjacent side of the car, and a weighted member associated with said car-supporting member and operative to assist the return of the car from tilted to upright position when the car is substantially empty but permitting the loaded car to tilt toward the door opener.

In testimony whereof I have hereunto set my hand in presence of two subscribing witnesses.

HENRY RICHARDSON.

Witnesses:
E. F. WHITE,
EDWARD BREWER.